(12) United States Patent
Han et al.

(10) Patent No.: US 7,242,392 B2
(45) Date of Patent: Jul. 10, 2007

(54) KEYPAD WITH EL UNITED IN KEYPAD RUBBER AND METHOD FOR FABRICATING THE SAME

(75) Inventors: Wan Soo Han, Hwaseong (KR); Ho Seok Ko, Suwon (KR); Sang Hoon Lee, Suwon (KR); Young Woo Lee, Suwon (KR)

(73) Assignee: Hansung Elcomtec Co., Ltd., Pyungtaek, Gyeonggi-do (KR)

( * ) Notice: Subject to any disclaimer, the term of this patent is extended or adjusted under 35 U.S.C. 154(b) by 317 days.

(21) Appl. No.: 10/434,609

(22) Filed: May 9, 2003

(65) Prior Publication Data

US 2004/0145573 A1 Jul. 29, 2004

(30) Foreign Application Priority Data

Jan. 24, 2003 (KR) .................. 10-2003-0004957

(51) Int. Cl.
*G09G 5/00* (2006.01)
(52) U.S. Cl. ....................... 345/170; 345/168
(58) Field of Classification Search ............. 345/170, 345/160, 168, 172, 173; 341/22, 23
See application file for complete search history.

(56) References Cited

U.S. PATENT DOCUMENTS

| | | | | |
|---|---|---|---|---|
| 5,453,405 | A * | 9/1995 | Fan et al. ................ | 438/34 |
| 6,310,612 | B1 * | 10/2001 | Kotsubo et al. ............ | 345/173 |
| 6,667,563 | B2 * | 12/2003 | Bae et al. .................. | 307/112 |
| 6,704,004 | B1 * | 3/2004 | Osteg.ang.rd et al. ...... | 345/170 |

| | | | | |
|---|---|---|---|---|
| 2002/0175899 | A1 * | 11/2002 | Yang ..................... | 345/169 |

FOREIGN PATENT DOCUMENTS

| | | |
|---|---|---|
| CN | 1291060 | 4/2001 |
| CN | 1387355 | 12/2002 |
| TW | 465777 | 11/2001 |
| TW | 508837 | 11/2002 |
| TW | 509955 | 11/2002 |

OTHER PUBLICATIONS

Taiwanese Office Action for Taiwanese Patent Application No. 092112280 issued on Aug. 10, 2006.
Chinese Office Action of the Chinese Patent Application No. 03131373.6, issued on Apr. 7, 2006.

* cited by examiner

*Primary Examiner*—Sumati Lefkowitz
*Assistant Examiner*—Ke Xiao
(74) *Attorney, Agent, or Firm*—Robert E. Bushnell, Esq.

(57) ABSTRACT

The present invention discloses to a keypad with an EL device for a backlight united with a keypad rubber and a method for fabricating the same for improving a click sensitivity and visibility of keys and preventing a wrong operation of the keys by using a silicon injection process.

The method for fabricating a keypad used in a portable terminal, comprises the steps of: fabricating a light-emitting device for a backlight; printing an adhesive on a front side and a back side of the light-emitting device; performing an injection process to form a silicon layer, the silicon layer united with the light-emitting device through the adhesive; cutting the light-emitting device united with the silicon layer in a regular shape suitable to the portable terminal; and attaching keys to portions of the silicon layer corresponding to a light-emitting portion of the front side in the light-emitting device.

14 Claims, 9 Drawing Sheets

KEYPAD WITH EL UNITED IN KEYPAD RUBBER AND METHOD FOR FABRICATING THE SAME

This application relies for priority upon Korean Patent Application No. 2003-4957, filed on Jan. 24, 2003, the contents of which are herein incorporated by reference in their entirety.

FIELD OF THE INVENTION

The present invention generally relates to a keypad used in a portable terminal, and more specifically, to a keypad with EL united in a keypad rubber and a method for fabricating the same for improving visibility and a click sensitivity and preventing a wrong operation of keys.

BACKGROUND OF THE INVENTION

A prior keypad used in a portable terminal is fabricated by attaching a keypad rubber, which is fabricated through a separate process, to keys printed with characters or numbers made through a key molding process by using adhesives. The keypad fabricated as above is assembled by being fixed on a printed circuit board where an LED (Light Emitting Diode) for a backlight is attached.

In the prior keypad used in the portable terminal, when a key is pressed, the keypad generates a signal by contacting a dome switch located on the printed circuit board with the key, and when released, the key returns to an original position. In the prior keypad, characters printed on the keypad rubber are recognized when the LED emits light with point luminous properties.

However, the prior keypad adopting the LED for a backlight causes non-uniformity of brightness. For instance, a part of the keypad near to the LED looks bright and a part far away from the LED looks dark owing to the point luminous properties, thereby deteriorating visibility.

In addition, since in the prior keypad applied with EL devices, keys adhere to the keypad rubber that is made through another process by using the adhesives, the keys' click sensitivity is deteriorated and flexibility is reduced as well. Thus, in case a key is pressed, it causes a problem of a wrong operation that another keys adjacent to the pressed key are simultaneously operated.

SUMMARY OF THE INVENTION

It is therefore an object of the present invention to provide a united keypad and a method for fabricating the same for improving a click sensitivity and visibility of keys and preventing a wrong operation of the keys by uniting a keypad rubber with EL devices for a backlight through a silicon injection process.

To accomplish the above object, the present invention provides an united keypad, comprising: a light-emitting device for a backlight; adhesive layers printed on a front side and a back side of the light-emitting device, respectively; a silicon layer united with the light-emitting device through the adhesive layers; and a plurality of keys attached to portions of the silicon layer corresponding to a light-emitting portion of the front side in the light-emitting device.

Furthermore, this invention provides an united keypad, comprising: a light-emitting device for a backlight; adhesive layers printed on a front side and a back side of the light-emitting device, respectively; a film including a plurality of keys arranged to correspond to a light-emitting portion of the front side in the light-emitting device; and a silicon layer united with the light-emitting device and the film through the adhesive layers, respectively.

The light-emitting device includes a plurality of EL elements arranged to be spaced apart each other by spaces formed therebetween and arranged to correspond to the keys, respectively. The spaces improve a click sensitivity of the keys and prevent a wrong operation caused by interference of neighboring keys. The silicon layer includes a plurality of protrusion portions formed on the back side of the light-emitting device by corresponding to each key, for improving a click sensitivity of the keys.

This invention provides a method for fabricating a keypad used in a portable terminal, comprising the steps of: fabricating a light-emitting device for a backlight; printing an adhesive on a front side and a back side of the light-emitting device; performing an injection process to form a silicon layer, the silicon layer united with the light-emitting device through the adhesive; cutting the light-emitting device united with the silicon layer in a regular shape suitable to the portable terminal; and attaching keys to portions of the silicon layer corresponding to a light-emitting portions of the front-side in the light-emitting device.

Furthermore, this invention provides a method for fabricating a keypad used in a portable terminal, comprising the steps of: fabricating a light-emitting device for a backlight; printing an adhesive on a front side and a back side of the light-emitting device; arranging a film including a plurality of keys to the front side of the light-emitting device, the keys arranged to correspond to a light-emitting portion of the front side in the light-emitting device; performing an injection process to form a silicon layer, the silicon layer united with the light-emitting device and the film through the adhesive; and cutting the light-emitting device united with the film by the silicon layer in a regular shape suitable to the portable terminal.

The light-emitting device includes a plurality of EL elements which are arranged to correspond to the keys, respectively, and further comprising the step of cutting unnecessary portions of the light-emitting device to form spaces to maintain a regular interval between the EL elements, after the adhesive printing step. During the injection process, a plurality of protrusion portions are formed in the silicon layer corresponding to the back side of the light-emitting device, the plurality of protrusion portions arranged to correspond to the keys, respectively.

BRIEF DESCRIPTION OF THE DRAWINGS

The above and other objects and advantages of the present invention will become readily apparent from the description that follows, with reference to the accompanying drawings, in which.

DETAILED DESCRIPTION OF THE PREFERRED EMBODIMENT

Figure 1:
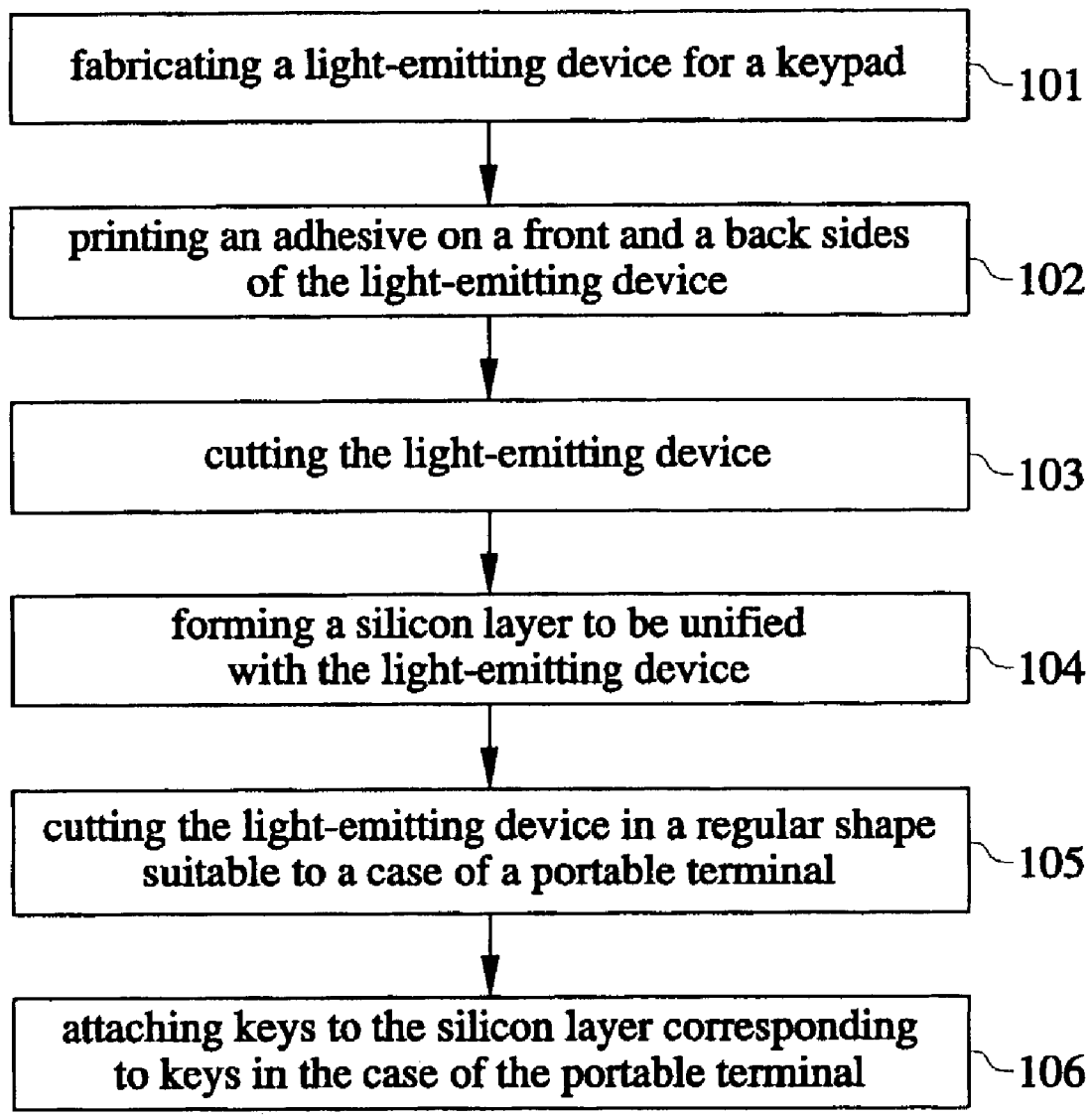
FIG. 1 is a flow chart illustrating a process sequence of fabricating a keypad in accordance with one embodiment of the present invention.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. It will also be understood that when a layer is referred to as being "on" another layer or substrate, it can be directly on the other layer or substrate or intervention layers may be also be present. Moreover, each embodiment described and illustrated herein includes its complementary conductivity type embodiment as well.

Hereinafter, the embodiment of the present invention will be described as follows in reference to the accompanying drawings.

FIG. 1 is a flow chart illustrating a process sequence of fabricating a key-attached keypad used in a portable terminal in accordance with a first embodiment of the present invention. FIG. 2A through FIG. 2E are cross-sectional views illustrating a method for fabricating the key-attached keypad in accordance with the first embodiment of the present invention.

Referring to FIG. 1, the keypad in accordance with the first embodiment is fabricated in sequence of: fabricating a light-emitting device including a plurality of EL elements used as a backlight of the keypad 101; printing an adhesive on a front side and a back side of the fabricated light-emitting device, respectively 102; cutting unnecessary parts of the light-emitting device where the adhesives are printed on the front side and the back side, respectively 103; forming a silicon layer united with the light-emitting device by performing an injection process 104; cutting the light-emitting device in regular shape suitable to a case of a portable terminal 105; and attaching keys on portions of the silicon layer corresponding to keys in the case of the portable terminal 106.

Next, a method for fabricating the keypad in accordance with the first embodiment according to the process sequence of FIG. 1 will be described as follows in reference to FIG. 2A through FIG. 2E.

Figure 2A:
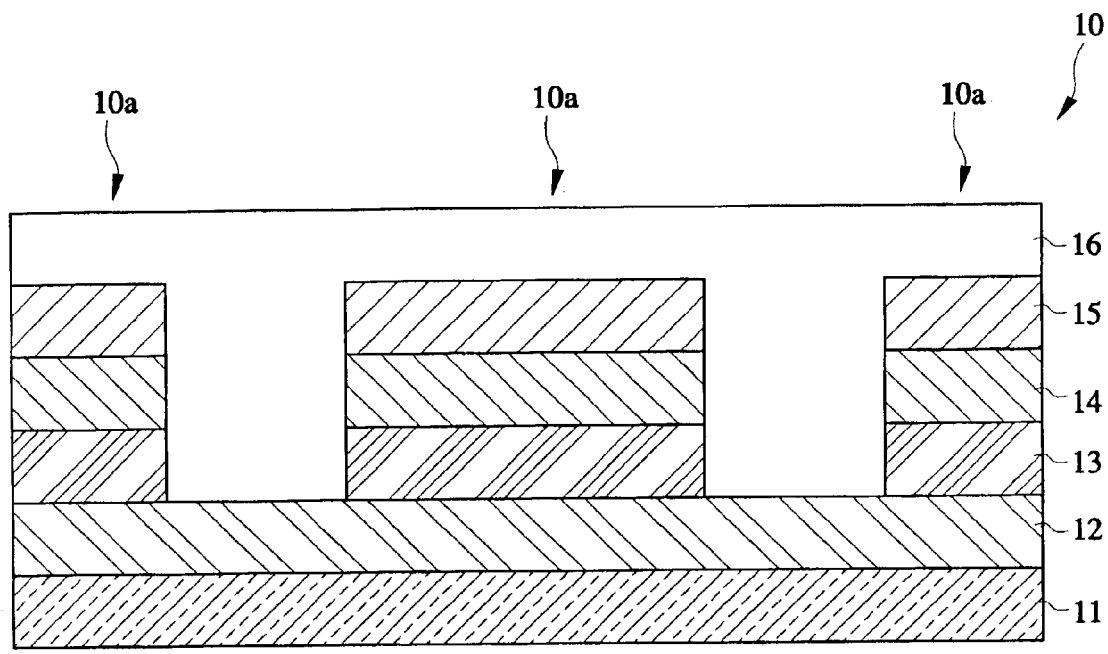
FIG. 2A through FIG. 2E are cross-sectional views illustrating a method for fabricating the keypad in accordance with one embodiment of the present invention in FIG. 1.

Referring to FIG. 2A, first, a light-emitting device 10 including a plurality of EL elements 10a used as a backlight is fabricated. A transparent electrode layer 12 composed of ITO is formed on a transparent insulation substrate 11 such as a PET (Polyethylene Terephthalate) film. A light-emitting layer 13, which is a fluorescent layer, is formed on the transparent electrode layer 12. An insulating layer 14, which is a dielectric layer, is formed on the light-emitting layer 13, and a back electrode layer 15 is formed on the insulating layer 14. Then, a protective layer 16 is formed to cover the light-emitting layer 13, the insulating layer 14, and the back electrode layer 15. In the EL element 10a, the transparent electrode layer 12 and the back electrode layer 15 function as two electrodes, and the light is emitted from the light-emitting layer 13 when power is applied to the electrodes.

Figure 2B:
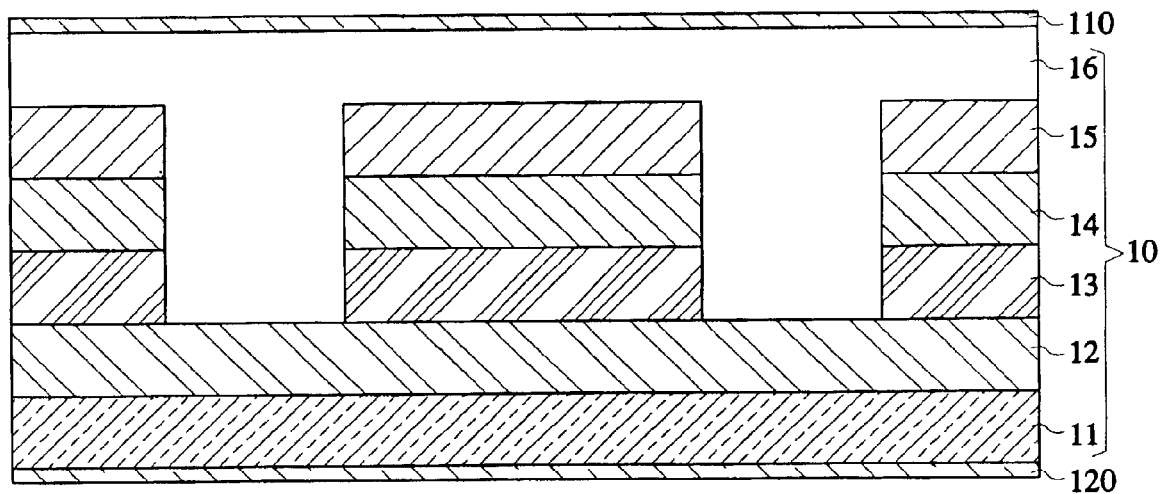

Referring to FIG. 2B, an adhesive is printed on a back side and a front side of the light-emitting device 10 fabricated as above, respectively, and is dried. The adhesive is printed on the protective layer 16 and the substrate 11, to form adhesive layers 110 and 120 on the back side and the front side of the light-emitting device 10, respectively. At this time, it is desirable to use the adhesive having an excellent adhesive force with the light-emitting device 10 and a silicon layer in the following process.

Figure 2C:
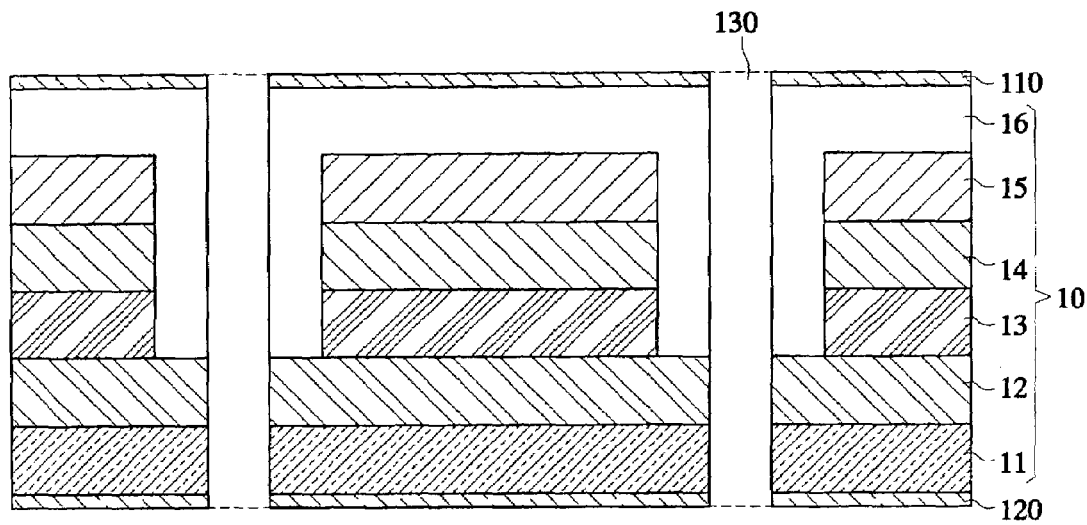

Referring to FIG. 2C, unnecessary parts of light-emitting device 10 where the adhesive layers 110 and 120 are formed in the back side and the front side are removed. For instance, the unnecessary parts except for parts required for light-emitting and operation of the light-emitting device 10 are cut. At this time, spaces 130 formed by cutting, the unnecessary portions improve flexibility between neighboring keys, thereby improving a click sensitivity as well as preventing a wrong operation caused by interference of the neighboring keys.

Figure 2D:
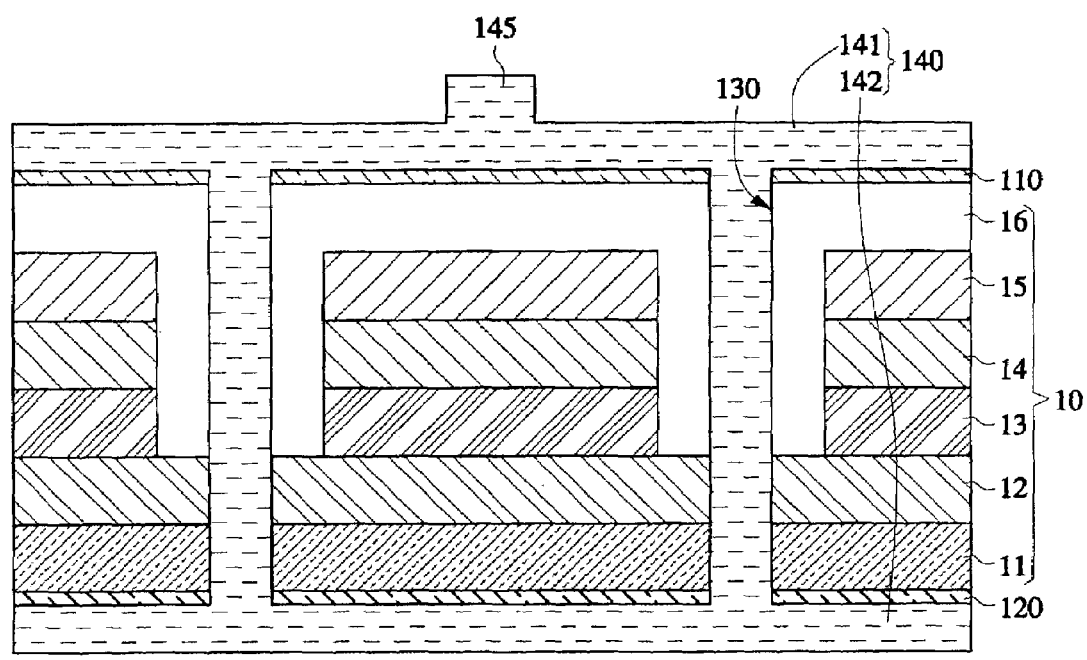

Referring to FIG. 2D, the light-emitting device 10 where unnecessary parts are cut is put in an injection mold and a silicon injection process is performed to form a silicon layer 140 on the back side and the front side of the light-emitting device 10. A portion 141 of the silicon layer 140 is formed on the back side of the light-emitting device 10, and the other portion 142 is formed on the front side of the light-emitting device 10. The silicon layer 140 has a plurality of protrusion portions 145 for clicking a dome switch, which are formed on the back side of the light-emitting device 10. Each protrusion portion is formed on a position corresponding to each EL element 10a. The protrusion portion 145 improves a click sensitivity of the keys when contacting with a dome switch (not shown) located on a printed circuit board.

At this point, by heat and pressure during the silicon injection process, the back side of the light-emitting device 10 adheres to the portion 141 of the silicon layer 140 through the adhesive layer 110, and the front side of the light-emitting device 10 adheres to the portion 142 of the silicon layer 140 through the adhesive layer 120. As a result, the light-emitting device 10 is united with the silicon layer 140 for a keypad rubber.

Figure 2E:
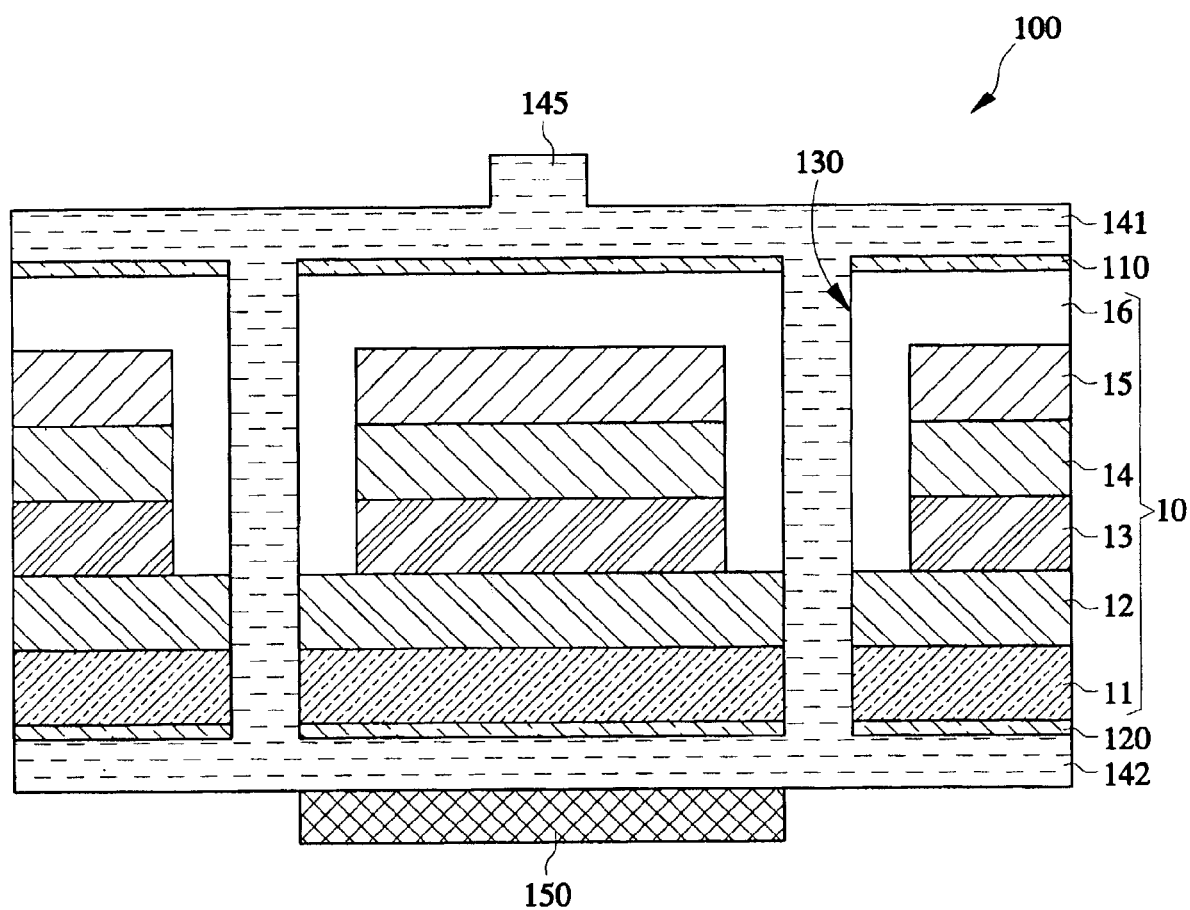

Referring to FIG. 2E, the light-emitting device 10 united with the silicon layer 140 is cut in a regular shape with a size corresponding to a case of a portable terminal and suitable to an apparatus hole for fixing a united keypad. Keys 150 printed with characters or numbers are attached to the front side of the silicon layer 140. The keys 150 are attached to correspond to keys in a case of the portable terminal. Therefore, the united keypad 100 in accordance with the first embodiment of the present invention is fabricated.

Figure 3:
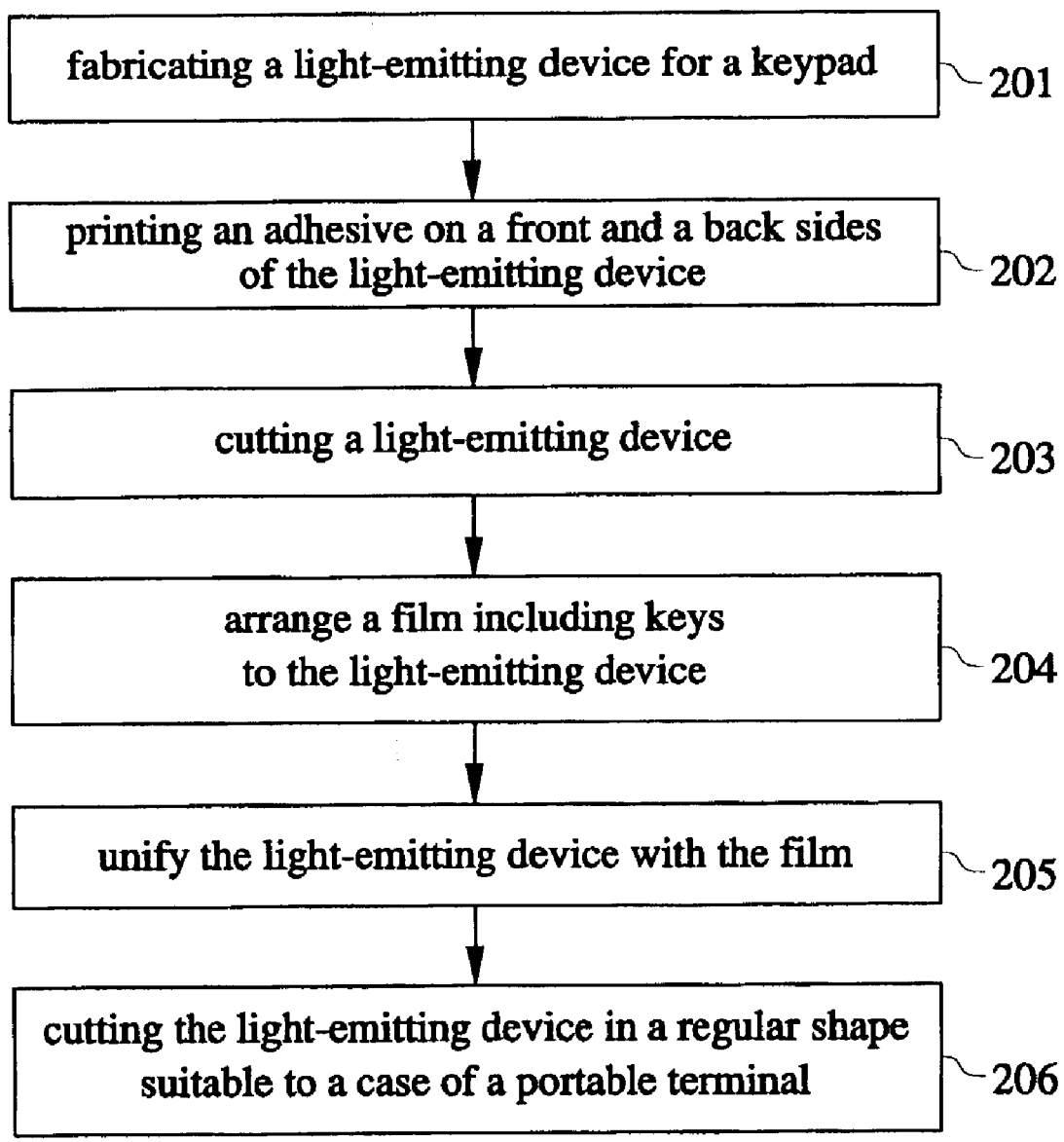
FIG. 3 is a flow chart illustrating a process sequence of fabricating a keypad in accordance with another embodiment of the present invention.

FIG. 3 is a flow chart illustrating a process sequence of fabricating a film type keypad used in a portable terminal using a film which is formed in a regular shape by a forming process, and characters or numbers are printed thereon in accordance with a second embodiment of the present invention. FIG. 4A through FIG. 4E are cross-sectional views illustrating a method for fabricating the film type keypad in accordance with the second embodiment of the present invention.

Referring to FIG. 3, the keypad in accordance with the second embodiment is fabricated by sequentially performing the processes of: fabricating a light-emitting device for a keypad 201; printing an adhesive both on a front side and a back side of the fabricated light-emitting device 202; cutting unnecessary parts of the light-emitting device where the adhesive is printed both on the front side and the back side 203; arranging a film including a plurality of keys in order that keys formed in the film correspond to a light-emitting portion of the front-side of the light-emitting device 204; filling silicon between EL device for the keypad and the film through a silicon injection process to unify the light-emitting device and the film 205; and cutting the light-emitting device in a regular shape with a size corresponding to a case of a portable terminal 206.

Next, a method for fabricating the keypad in accordance with the second embodiment in the process sequence of FIG. 3 will be described as follows in reference to FIG. 4a through FIG. 4E.

Figure 4A:
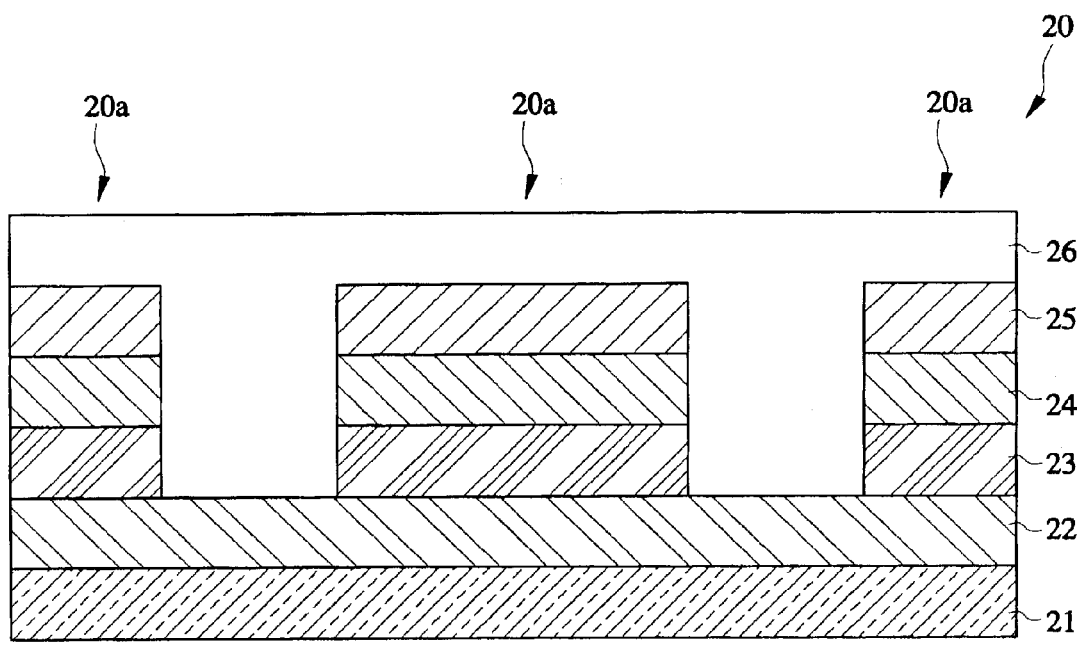
FIG. 4A through FIG. 4E are cross-sectional views illustrating a method for fabricating the keypad in accordance with another embodiment of the present invention in FIG. 3.

Referring, to FIG. 4A, first, the light-emitting device 20 including a plurality of EL elements 20a used as a backlight is fabricated. Like the light-emitting device 20 in accordance with the first embodiment, the light-emitting device 20 comprises a transparent electrode layer 22, a light-emitting layer 23, an insulating layer 24, a back electrode layer 25, and a protective layer 26, which are sequentially formed on a transparent insulation substrate 21.

Figure 4B:
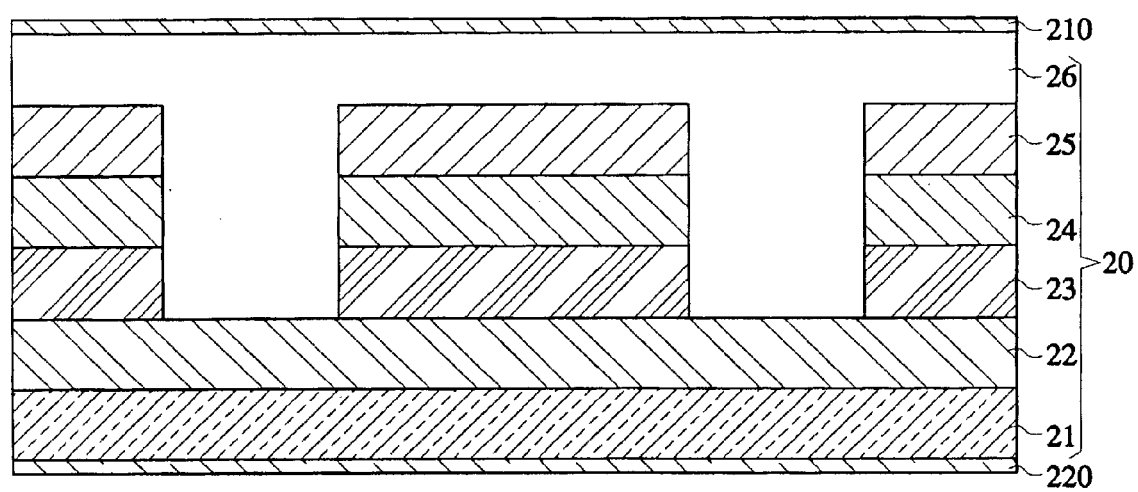

In the first and the second embodiments, though the light-emitting devices 10 and 20 have the structure as shown in FIG. 2B and FIG. 4B the light-emitting device having various structures is used in the united keypad of the present invention without restriction on the above structure.

Referring to FIG. 4B, an adhesive, which has an excellent adhesive force between the light-emitting device 20 and a silicon layer, is printed on a back side and a front side of the light-emitting device 20 and is dried. Therefore, adhesive layers 210 and 220 are formed on a back side and a front side of the light-emitting device 20, respectively.

Figure 4C:
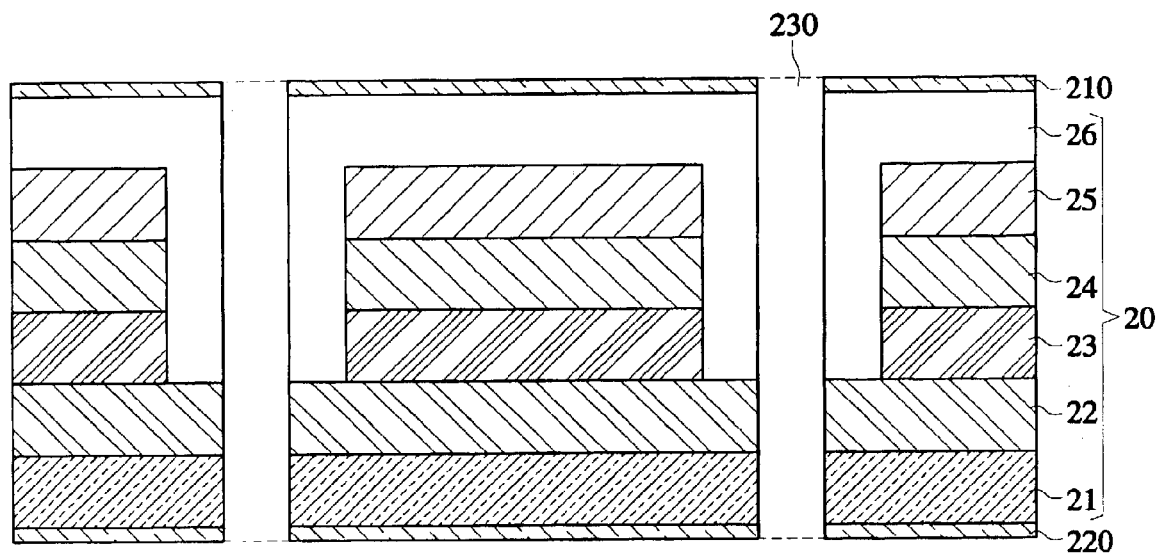

Referring to FIG. 4C, unnecessary parts of the EL device except for parts required for operation and light emission of the light-emitting device 20 are cut. Like the spaces 130 of FIG. 2C, spaces 230 formed by cutting the unnecessary parts improve a click sensitivity and prevent a wrong operation of keys.

Figure 4D:
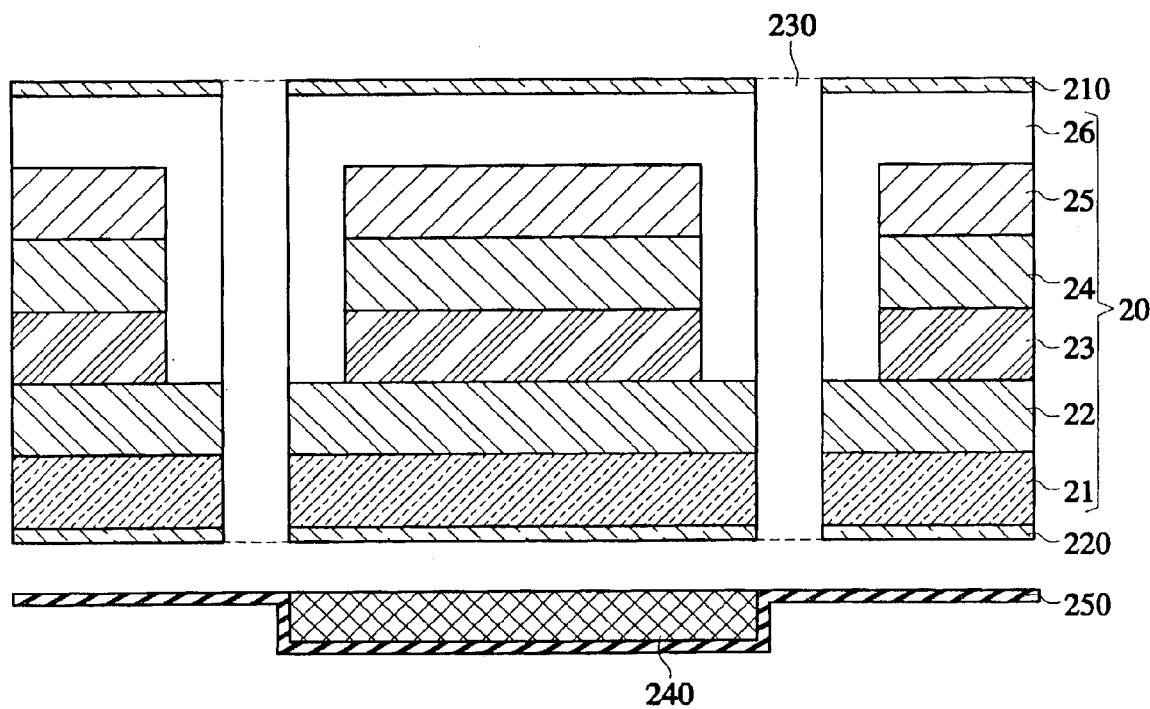

Referring to FIG. 4D, a film 250 including keys 240 is aligned with the light-emitting device 20 in order for each key 240 to correspond to a light-emitting portion of the front side of the light-emitting device 20. At this moment, the keys 240 of a regular shape are formed on the film 250 to correspond to keys of a case in a portable terminal through a forming process, and characters or numbers are printed on portions of the film 250 corresponding, to the keys 240.

Figure 4E:
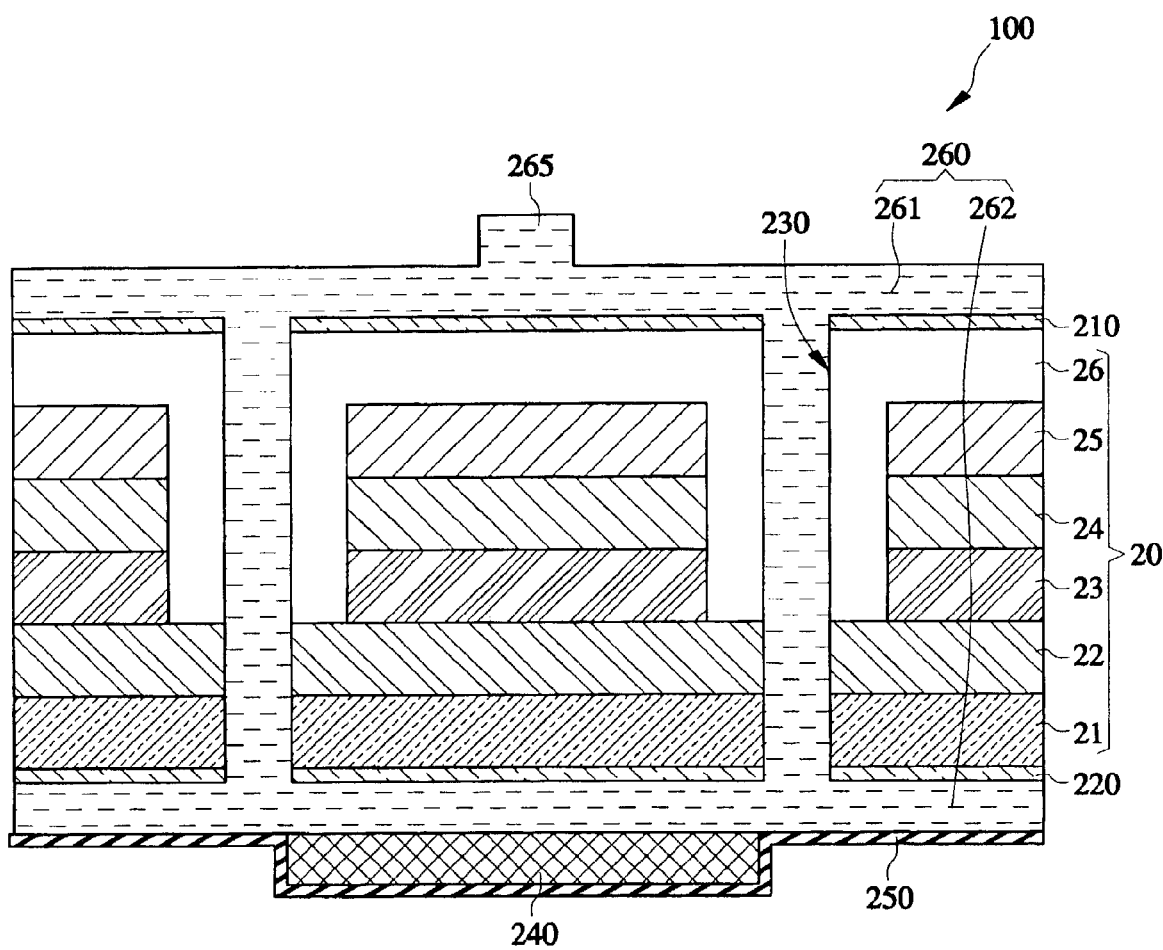

Referring to FIG. 4E, under the alignment of the light-emitting device 20 with the film 250, a silicon injection process is performed to fill silicon between the light-emitting device 20 and the film 250. Therefore, a silicon layer 260 is formed to unify the light-emitting device 20 for a keypad with the film 250. A portion 261 of the silicon layer 260 is formed on the back side of the light-emitting device 20 and the other portion 262 is formed between the front side of the light-emitting device 20 and the film 250. The silicon layer 260 includes a plurality of protrusion portions 265, which are formed on the back side of the light-emitting device 20 to improve a click sensitivity. Each protrusion portion 265 is formed corresponding to each EL element 20a of the light-emitting device 20.

At this time, by heat and pressure during the silicon injection process, the back side of the light-emitting device 20 adheres to the portion 261 of the silicon layer 260 through the adhesive layer 210 and the front side of the light-emitting device 20 adheres to the portion 262 of the silicon layer 260 through the adhesive layer 220. Therefore, the light-emitting device 20 is united to the film 250 through the silicon layer 260.

Next, the light-emitting device 20 united with the film 250 is cut in a regular shape with a size corresponding to a case of a portable terminal and suitable to an apparatus hole to fix the united keypad, thereby fabricating the united keypad in accordance with the second embodiment of the present invention.

Figure 5:
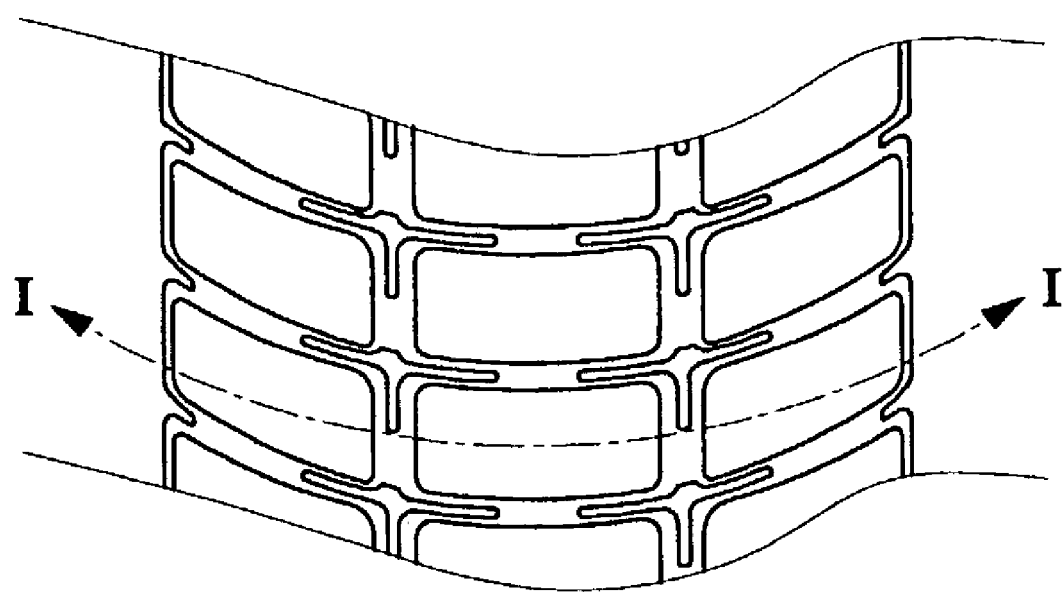
FIG. 5 is a diagram illustrating an example of a keypad fabricated according to preferred embodiments of the present invention.

FIG. 5 is a diagram illustrating an essential portion of keys only in a keypad, as an example of the keypad in accordance with an embodiment of the present invention. FIG. 2A through FIG. 2E and FIG. 4A through FIG. 4E are cross-sectional views taken along the line I–I' of FIG. 5.

According to the preferred embodiments of the present invention as above, the keypad unifies the silicon layer for a keypad rubber with EL devices through an adhesive printing process and a silicon injection process to improve a click sensitivity and to prevent a wrong operation of the keys, as well as to improve visibility by using the EL device having surface light-emitting properties as a backlight.

It is to be understood that changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

What is claimed is:

1. A united keypad, comprising:
   a light-emitting device for a backlight, the light-emitting device includes a plurality of EL elements arranged to be spaced apart each other by spaces formed therebetween;
   adhesive layers printed on a front side and a back side of the light-emitting device, respectively;
   a silicon layer united with the light-emitting device through the adhesive layers, the silicon layer being formed in the spaces formed between the EL elements, the EL elements being united each other by the silicon layer; and
   a plurality of keys attached to portions of the silicon layer and arranged to correspond to a light-emitting portion of the front side in the light-emitting device, each of the plurality of EL elements arranged to one-to-one correspond to one key of the plurality of keys, respectively.

2. The united keypad of claim 1, wherein the spaces improve a click sensitivity of the keys and prevent a wrong operation caused by interference of neighboring keys.

3. The united keypad of claim 1, wherein the silicon layer includes a plurality of protrusion portions formed on the back side of the light-emitting device by corresponding to each key, for improving a click sensitivity of the keys.

4. A united keypad, comprising:
   a light-emitting device for a backlight, the light-emitting device includes a plurality of EL elements arranged to be spaced apart each other by spaces formed therebetween;
   adhesive layers printed on a front side and a back side of the light-emitting device, respectively;
   a silicon layer united with the light-emitting device through the adhesive layers, the silicon layer being formed in the spaces formed between the EL elements, the EL elements being united each other by the silicon layer; and
   a film formed on a surface of the silicon layer, the film including a plurality of keys, each of keys being arranged to one-to-one correspond to one of the EL elements.

5. The united keypad of claim 4, wherein the spaces improve a click sensitivity of the keys and prevent a wrong operation caused by interference of neighboring keys.

6. The united keypad of claim 4, wherein the silicon layer includes a plurality of protrusion portions formed on the back side of the light-emitting device by corresponding to each key, for improving a click sensitivity of the keys.

7. A keypad adapted to a portable terminal, comprising:
a light-emitting device forming a backlight, the light-emitting device includes a plurality of EL elements arranged to be spaced apart each other to maintain a regular interval between the EL elements;
an adhesive printed on a front side and a back side of the light-emitting device;
a silicon layer united with the light-emitting device through the adhesive, the silicon layer being formed in the spaces formed between the EL elements, the EL elements being united each other by the silicon layer;
the light-emitting device united with the silicon layer being formed in a regular shape suitable to the portable terminal; and
a plurality of keys attached to portions of the silicon layer corresponding to a light-emitting portion of the front side in the light-emitting device, each of the plurality of EL elements arranged to one-to-one correspond to one key of the plurality of keys.

8. The keypad of claim 7, wherein said silicon layer comprises a plurality of protrusions formed on the back side of the light-emitting device, said plurality of protrusions being arranged to correspond to different ones of the keys.

9. A keypad adapted to a portable terminal, comprising:
a light-emitting device forming a backlight, the light-emitting device includes a plurality of EL elements arranged to be spaced apart each other to maintain a regular interval between the EL elements;
an adhesive printed on a front side and a back side of the light-emitting device;
a silicon layer united with the light-emitting device through the adhesive, the silicon layer being formed in the spaces formed between the EL elements, the EL elements being united each other by the silicon layer, the light-emitting device being united with the silicon layer in a regular shape suitable to the portable terminal; and
a film formed on a front surface of the silicon layer, the film including a plurality of keys, each of keys being arranged to one-to-one correspond to one of the EL elements.

10. The keypad of claim 9, wherein said silicon layer comprises a plurality of protrusions formed on the back side of the light-emitting device, said plurality of protrusions being arranged to correspond to different one of the keys.

11. The united keypad of claim 1, wherein an adhesive of the adhesive layers is heat curable.

12. The united keypad of claim 1, wherein the light-emitting device comprises a transparent electrode layer and a transparent insulation substrate.

13. The united keypad of claim 4, wherein said plurality of keys is disposed between said film and said silicon layer.

14. The united keypad of claim 1, comprised of the silicon layer integrally and seamlessly enclosing the light-emitting device, the silicon layer integrally and seamlessly formed by injecting a silicon material into a mold containing the light-emitting device, the adhesive layers printed before forming the silicon layer.

* * * * *